US007878311B2

United States Patent

Van Weelden et al.

(10) Patent No.: US 7,878,311 B2
(45) Date of Patent: Feb. 1, 2011

(54) PISTON WITH AN INTEGRAL ELECTRICALLY OPERATED ADJUSTMENT VALVE FOR A HYDRAULIC VIBRATION DAMPER

(75) Inventors: Curtis L. Van Weelden, Waukesha, WI (US); Dean S. Wardle, Waukesha, WI (US)

(73) Assignee: Husco Automotive Holdings, LLC, Waukesha, WI (US)

( * ) Notice: Subject to any disclaimer, the term of this patent is extended or adjusted under 35 U.S.C. 154(b) by 865 days.

(21) Appl. No.: 11/779,958

(22) Filed: Jul. 19, 2007

(65) Prior Publication Data

US 2009/0020382 A1 Jan. 22, 2009

(51) Int. Cl.
*F16F 9/34* (2006.01)

(52) U.S. Cl. ............................ 188/322.15; 188/282.2; 188/282.7; 188/316; 137/487.5

(58) Field of Classification Search ............. 188/282.2, 188/282.3, 282.7, 282.8, 322.13, 322.15, 188/322.22, 275, 316; 137/487.5, 489, 490, 137/493.8; 251/30.01, 30.04
See application file for complete search history.

(56) References Cited

U.S. PATENT DOCUMENTS 5,067,687 A 11/1991 Patel et al.
5,085,299 A * 2/1992 Spiess et al. ............ 188/266.5
5,094,321 A * 3/1992 Neumann ................. 188/285
5,234,085 A * 8/1993 Schneider ............... 188/282.8
5,303,804 A * 4/1994 Spiess .................... 188/266.5
5,409,088 A * 4/1995 Sonsterod ............... 188/282.3
5,501,307 A * 3/1996 Lars ....................... 188/282.3
5,538,026 A 7/1996 Kazi
5,850,896 A * 12/1998 Tanaka ................... 188/266.2
6,003,644 A * 12/1999 Tanaka ................... 188/266.5
6,371,262 B1 * 4/2002 Katou et al. ............ 188/266.5
6,394,238 B1 5/2002 Rogala
6,491,145 B2 12/2002 Adamek et al.
6,575,484 B2 6/2003 Rogala et al.
6,729,446 B2 * 5/2004 Sakai et al. ............. 188/266.2
6,782,980 B2 * 8/2004 Nakadate ................... 188/313
6,834,736 B2 12/2004 Greisbach et al.
6,860,369 B2 3/2005 Weiffen et al.
7,234,386 B2 6/2007 Schedgick et al.
7,654,369 B2 * 2/2010 Murray et al. .......... 188/266.5

* cited by examiner

*Primary Examiner*—Robert A Siconolfi
*Assistant Examiner*—Mariano Sy
(74) *Attorney, Agent, or Firm*—Quarles & Brady LLP; George E. Haas

(57) ABSTRACT

A vibration damper includes a cylinder within which a piston is slidably received thereby defining compression and rebound chambers. The piston has a bore with a valve seat through which fluid flows between those chambers. A poppet selectively engages the valve seat and forms a pilot chamber an opposite side of the poppet from the valve seat. The greater pressure within the compression or rebound chambers is applied by a first logic arrangement to the pilot chamber and a pilot spool control a fluid flow between the pilot chamber and a pressure cavity in the piston body. A second logic arrangement connects the pressure cavity to either the compression and rebound chamber which has the lesser pressure. A solenoid that moves the pilot valve element to control pressure in the pilot chamber and thus the amount that the poppet moves to allow fluid flow through the piston.

22 Claims, 4 Drawing Sheets

PISTON WITH AN INTEGRAL ELECTRICALLY OPERATED ADJUSTMENT VALVE FOR A HYDRAULIC VIBRATION DAMPER

CROSS-REFERENCE TO RELATED APPLICATIONS

Not applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus, such as shock absorbers, for damping vibration in a motor vehicle, and more particularly to such apparatus having a dynamically adjustable damping characteristic.

2. Description of the Related Art

Hydraulic shock absorbers are commonly placed between the axles and the frame of a motor vehicle to reduce transmission of vibration from the wheels. Large trucks and off-road vehicles used in construction and agriculture incorporate similar vibration damping devices between the vehicle frame and the operator cab or between a seat and the vehicle body. The purpose of all these apparatus is to isolate the occupants from vibrations produced as the vehicle travels over the ground.

A typical prior hydraulic vibration damper comprised a cylinder divided by a damping piston into two working chambers filled with a fluid. The cylinder was attached to either the axle or the frame of the vehicle and the piston was attached by a rod to the other vehicle component. Thus movement of the axle relative to the frame caused the piston to slide within the cylinder thereby expanding one chamber and contracting the other chamber. Motion which extends the piston rod from the cylinder is referred to as rebound and motion in the opposite direction is compression. The damping piston had one or more fixed orifices through which the fluid flowed between the cylinder chambers. The orifices restricted the flow rate of that fluid flow thereby limiting the rate of piston movement to dampen the vibration. Such prior apparatus provided a fixed damping force for any given velocity.

Subsequently, adjustable vibration dampers were developed that included a bypass passage arranged between the two working chambers. An electrically operated proportional valve and a pressure-dependent valve were placed in series and activated during rebound and compression. The activation of the electrically operated valve was controlled in response to vibration of the vehicle detected by a sensor and opened the bypass passage by an amount that provided proportionally variable damping effect. The pressure-dependent valve opened only in response to pressure exceeding a defined level.

The bypass passage and its valves were mounted outside the vibration damper cylinder and increased the space required for that assembly. It is desirable to incorporate the functionality of the bypass passage into the cylinder and make a more compact assembly.

SUMMARY OF THE INVENTION

A vibration damper comprises a cylinder and a piston slidably received within the cylinder, thereby defining a compression chamber and a rebound chamber. The piston has a piston body with a bore into which the compression and rebound chambers open and has a valve seat within the bore through which fluid flows between the compression and rebound chambers. A poppet engages and disengages the valve seat to close and open a fluid path there through. A pilot chamber is formed on a side of the poppet remote from the valve seat. A first logic arrangement applies the greater of the pressures in the compression and rebound chambers to the pilot chamber.

A pilot valve element, such as a spool for example, is moved by an electrically driven actuator to selectively open and close a fluid path between the pilot chamber and a pressure cavity in the piston body. A second logic arrangement opens the pressure cavity to whichever of the compression and rebound chambers has a lesser pressure than pressure in the pressure cavity.

In a preferred embodiment, the pilot valve member has a first position in which fluid flows between the pilot chamber and the pressure cavity at a first rate, a second position in which fluid flows between the pilot chamber and the pressure cavity at a second rate that is greater than the first rate, and a third position which blocks fluid flow between the pilot chamber and the pressure cavity.

Preferably, the first logic arrangement comprises a first check valve through which fluid flows from the compression chamber to the pilot chamber, and a second check valve through which fluid flows from the rebound chamber to the pilot chamber. The second logic arrangement comprises a third check valve through which fluid flows from the pressure cavity to the compression chamber, and a fourth check valve through which fluid flows from the pressure cavity to the rebound chamber.

DETAILED DESCRIPTION OF THE INVENTION

Figure 1:
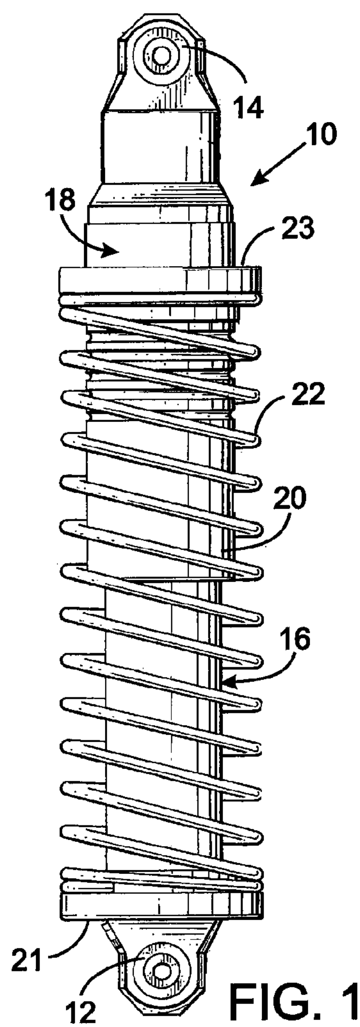
FIG. 1 is a side elevational view of a hydraulic vibration damper that incorporates a novel piston.

With initial reference to FIG. 1, a vibration damper 10 has first and second couplings 12 and 14, which enable the device to be attached between two components of a vehicle to reduce transmission of vibrations from one component to the other. The first coupling 12 is at an end of a cylinder 16 and the second coupling 14 is at one end of a piston assembly 18 that has a tubular skirt 20 extending around the cylinder 16 in a manner that allows the piston assembly and the cylinder to move longitudinally with respect to each other. The particular vibration damper 10 has an external spring 22 between a flange 21 on the cylinder 16 and another flange 23 on the piston assembly 18. However, the present invention can be employed with vibration dampers that do not have an external spring. Motion of the two vehicle components attached to couplings 12 and 14 produces compression of the vibration damper 10 in which the two couplings come toward each other and produces an opposite motion known as rebound. The present invention provides a novel piston for use with a variety of standard vibration dampers, thus the remainder of the vibration damper 10 has a conventional design.

Figure 2:
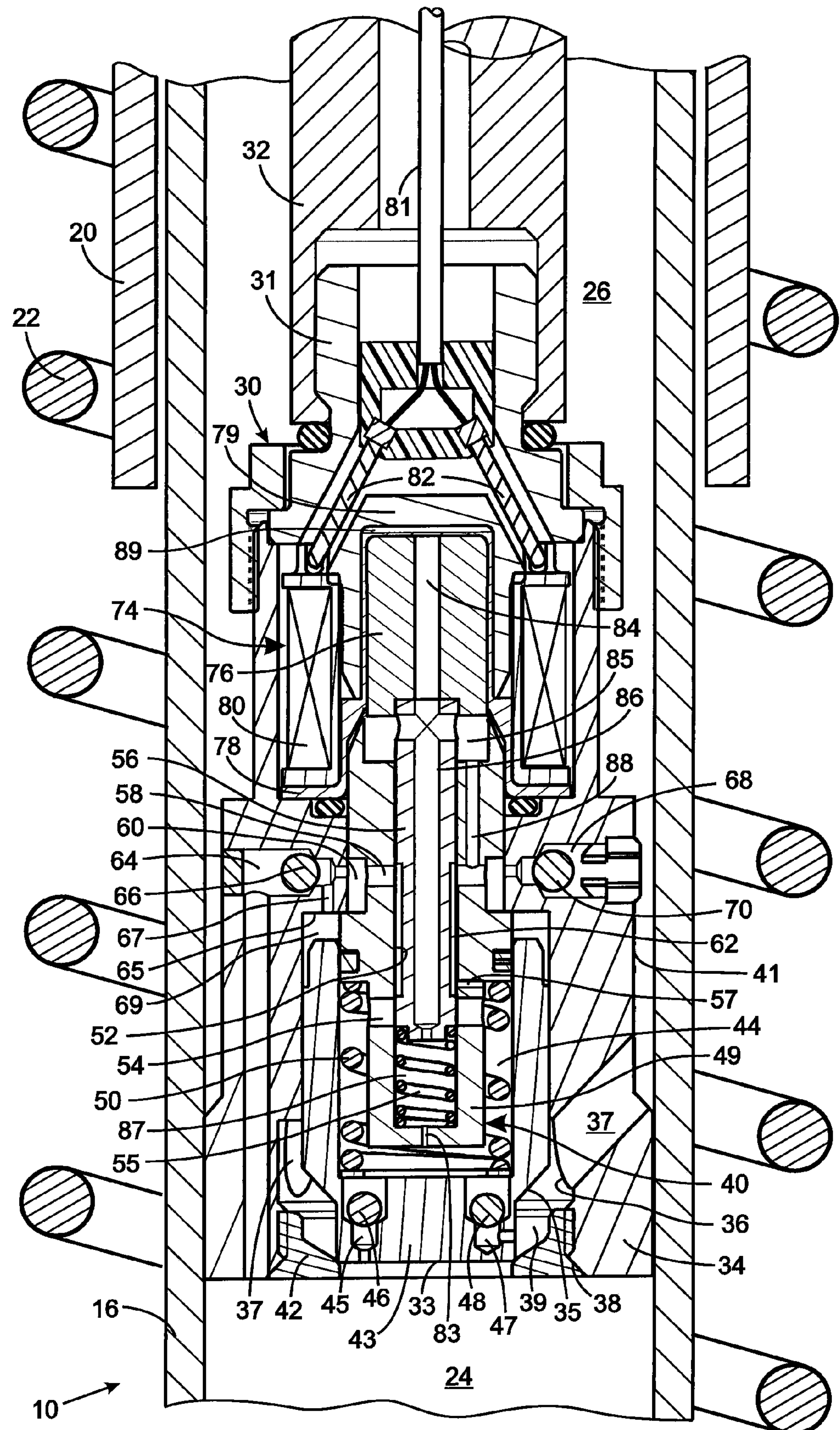
FIG. 2 is a longitudinal cross sectional view of a piston assembly in a de-energized state within the hydraulic vibration damper.

With reference to FIG. 2, that motion moves a piston 30 within the cylinder 16, wherein the piston is attached to a piston rod 32, both of which are parts of the piston assembly 18. Specifically, one end of the piston rod 32 is threaded onto a fitting 31 at one end of the piston 30 and extends through an opening (not shown) in the upper end of the cylinder 16 to the second coupling 14. The piston 30 includes a piston body 34 that is snuggly, yet slideably, received within the cylinder 16, thereby defining a compression chamber 24 and a rebound chamber 26 within the cylinder on opposite sides of the piston. Optionally, a resilient sealing ring may be provided around the lower portion of the piston body 34 that contacts the inner surface of the cylinder. The piston body 34 has a longitudinal bore 36 extending there through with one end of the bore opening into the compression chamber 24 and the other end of the bore being closed by the piston rod fitting 31.

Figure 3:
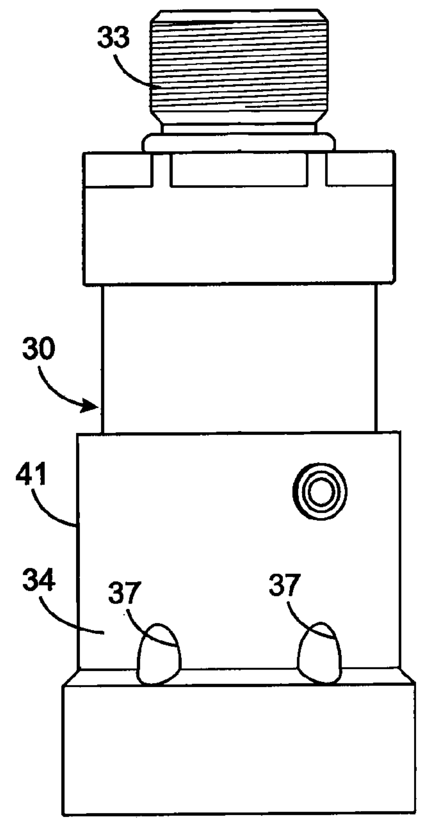
FIG. 3 is a side elevational view of the piston assembly.

A valve assembly 40 is located within the bore 36 of the piston body 34 and includes a valve seat 42 in the form of an annular ring inserted into the bore opening 38 at the compression chamber 24. A poppet 43 is slideably received within the bore 36 to selectively engage and disengage the valve seat 42, thereby closing and opening communication between the bore and the compression chamber 24. When the poppet 43 engages the valve seat 42, a first surface 33 on the poppet is exposed through the valve seat to pressure in the compression chamber 24 and an annular second poppet surface 35 is exposed to pressure in an interior chamber 39 formed between the poppet and the valve seat 42. The interior chamber 39 is connected to the rebound chamber 26 by a plurality of apertures 37 extending at angles through the side of the piston body 34 (see also FIG. 3) to an annular exterior recess 41 around the piston and opening into the rebound chamber 26. The exterior recess 41 is closed off from the compression chamber 24. Thus, the pressure in the rebound chamber 26 is communicated to the interior chamber 39.

A first pressure passage 45 extends through the poppet 43 between the compression chamber 24 and a pilot chamber 44 on the opposite side of the poppet from the valve seat. A first check valve 46 within the first pressure passage permits fluid to flow only from the compression chamber into the pilot chamber. A second pressure passage 47 extends between the interior chamber 39 and the pilot chamber 44 and has a second check valve 48 therein that allows fluid to flow only in a direction from the interior chamber 39 into the pilot chamber 44. The first and second check valves 46 and 48 form a first logic arrangement that conveys the greater pressure in either the compression or rebound chamber 24 or 26 into the pilot chamber 44.

A stationary pilot valve body 49 projects into the poppet 43 which is able to slide over the pilot valve body against the force of a first spring 50 biasing the poppet toward the valve seat 42. The pilot valve body 49 has a pilot bore 52 has an open end facing the piston rod 32 and has a closed opposite end proximate the poppet 43. A plurality of first fluid passages 54 extends transversely between the pilot bore 52 and the pilot chamber 44 within the poppet 43. A significantly smaller single vent orifice 57 also is located between the pilot bore 52 and the pilot chamber 44. A plurality of second fluid passages 58 extends transversely from the pilot bore 52 through the pilot valve body 49 to an annular pressure cavity 60 around the pilot valve body.

The second fluid passages 58 communicate with a third pressure passage 64 that extends through the piston body 34 to the compression chamber 24. A third check valve 66 is located within the third pressure passage 64 and allows fluid to flow there through only in a direction from the pressure cavity 60 to the compression chamber 24. A bleed orifice 67 is connected adjacent the opening of the third pressure passage 64 into the pressure cavity 60 and provides a fluid path to a piston cavity 69 between the interior end of the poppet 43 and a shoulder 65 of the bore 36 in the piston body 34. That fluid path through the bleed orifice 67 is maintained regardless of the position of the third check valve 66. The pressure cavity 60, and thus the second fluid passages 58, in pilot valve body 49 also open into a fourth pressure passage 68 extending through the piston body 34 to the exterior recess 41 and thereby communicating with the rebound chamber 26. A fourth check valve 70 allows fluid to flow through the fourth pressure passage 68 only from the pressure cavity 60 to the exterior recess 41. The third and fourth check valves 66 and 70 along with the respective third and fourth pressure passages 64 and 68 form a second logic arrangement that conveys fluid from the second fluid passages 58 and associated internal piston cavities into whichever of the compression or rebound chamber 24 or 26 is at the lower pressure than the pressure cavity 60.

A pilot spool 56 is slideably received within the pilot bore 52 and is biased outwardly from the pilot valve body 49 by a second spring 55. The pilot spool 56 has a wide exterior annular groove 62 extending there around to provide a flow path between the first and second fluid passages 54 and 58 and the vent orifice 57 in certain positions of the pilot spool within the pilot bore 52, as will be described.

The pilot spool 56 is moved into those positions by an electrically operated actuator, such as a solenoid 74, located within the piston body 34. The remote end of the pilot spool 56 is secured within a recess in an armature 76, that slides inside a tube 78 contained in a pole piece 79. Two armature cavities 85 and 89 are formed within the solenoid 74 on opposite sides of the armature 76. The tube 78 and pole piece 79 project into a central opening of an electromagnetic coil 80 to which electric current is applied via a pair of contacts 82 connected to wires of a cable 81 from a control circuit for the vibration damper. The application of electric current to the electromagnetic coil 80 creates a magnetic field that causes movement of the armature 76 and the pilot spool 56 attached thereto toward the poppet 43. That motion opens and closes communication of the pilot spool's exterior annular groove 62 with the first and second fluid passages 54 and 58 and the vent orifice 57.

The armature 76 has a longitudinal aperture 84 that opens into an aperture 86, which extends longitudinally through the pilot spool 56. That latter aperture 86 has side openings into the armature cavity 85 between the armature 76 and the pilot valve body 49. Thus, the apertures 84 and 86 interconnect both armature cavities 85 and 89 and a spool cavity 87 within the pilot valve body 49 at the opposite end of the pilot spool 56. Those cavities are further connected by a relief passage 88 to one of the second fluid passages 58 to relieve pressure within the internal cavities through either check valve 66 or 70 to the compression or rebound chamber 24 or 26, respectively.

With continuing reference to FIG. 2, several other internal passageways in the piston 30 aid motion of the pilot spool 56 and the poppet 43. Specifically, a bleed orifice 67 vents fluid from a cavity 69 between the interior end of the poppet 43 and the shoulder 65 of the bore 36 in the piston body 34. With this venting, fluid within the cavity 69 does not impede motion of the poppet 43 away from the valve seat 42 and enables a very low dampening factor. In addition, a relief passage 88 in the pilot valve body 49 communicates with the cavities 85 and 89 on both sides of the armature 76 and the second fluid passages 58 to vent fluid in those cavities that would otherwise affect armature movement.

A small orifice 83 extends through the pilot valve body 49 providing a path between the spool cavity 87 within that body and the pilot chamber 44. This orifice 83 forms a pressure divider so that the pressure within the spool cavity 87 is proportionally related to the pressure within the pilot chamber 44. Thus, in the fully energized state of the solenoid 74, in which the pilot spool 56 closes the second fluid passages 58, a significantly increased pressure within the pilot chamber 44 is communicated into the spool cavity 87 thereby pushing the pilot spool upward toward the solenoid 74. This motion of the pilot spool 56 reopens the upper second fluid passages 58, allowing the poppet 43 to unseat and open a passageway between the compression and rebound chambers 24 and 26.

Figure 4:
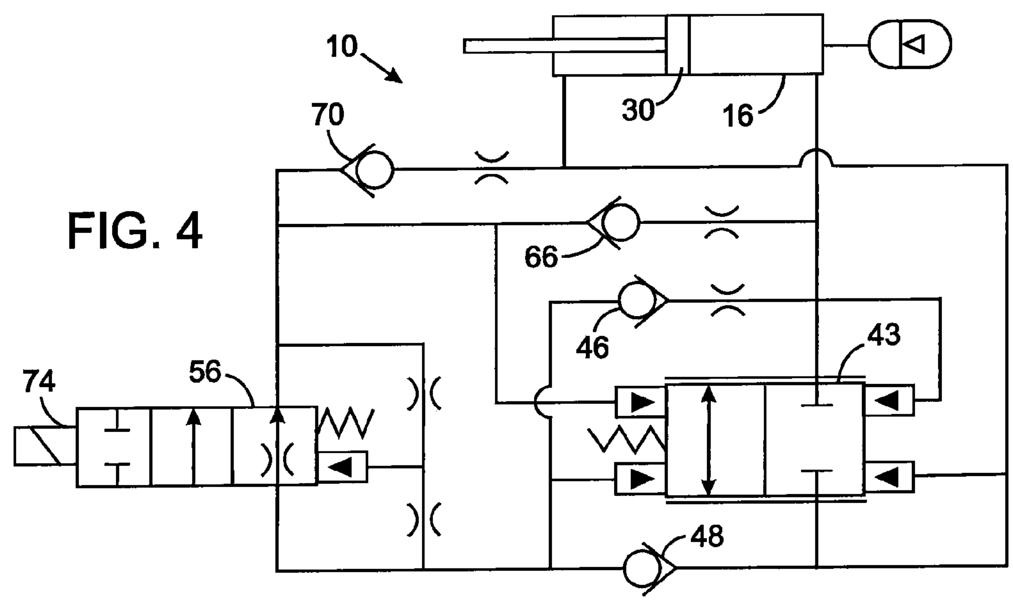
FIG. 4 is a schematic diagram of a hydraulic circuit formed by components of the piston assembly.

The components of the piston 30 define a hydraulic circuit that is depicted schematically in FIG. 4.

Upon installation on a vehicle, exertion of external force either extends or contracts the vibration damper 10, thereby sliding the piston 30 within the cylinder 16. Depending upon the direction of the piston motion, pressure within either the compression or rebound chamber 24 or 26 increases, while pressure in the other chamber decreases. Fluid is transferred through the piston in a controlled manner from the chamber with a higher pressure to the chamber with a lower pressure to dampen the piston motion. The rate at which the fluid flows determines the stiffness of the vibration dampening which is varied by adjusting the amount that the valve assembly 40 is opened.

To understand the operation of the valve assembly 40, it is beneficial to be familiar with how its internal chambers and passages communicate with the compression and rebound chambers 24 and 26 depending upon the pressure differential in those chambers. First realize that interior chamber 39, between the poppet 43 and the valve seat 42, continuously communicates into the rebound chamber 26 via apertures 37 in the piston body 34 and the annular exterior recess 41. As noted previously, the first and second check valves 46 and 48 provide a first logic arrangement that conveys the greater pressure in either the compression or rebound chamber 24 or 26 into the pilot chamber 44. The third and fourth check valves 66 and 70 along with the respective third and fourth pressure passages 64 and 68 form a second logic arrangement that conveys fluid from the second fluid passages 58 via the pressure cavity 60 into the compression or rebound chamber 24 or 26 that is at the lower pressure.

FIG. 2 shows the valve assembly 40 in a de-energized state in which the second spring 55 pushes the pilot spool 56 and the armature 76 away from the closed end of the pilot valve body 49 and farther into to solenoid 74, i.e. upward in the illustrated orientation. In this first position, a land at the lower end of the pilot spool 56 closes the inner opening of the first fluid passage 54 in the pilot valve body 49, thereby blocking flow through that passage. Therefore, the pilot chamber 44 essentially is closed off from the second fluid passage 58, which is at the lower of the two pressures in the compression and rebound chambers 24 and 26. This results in the pilot chamber 44 containing fluid at the greater of those two pressures because of the operation of the first and second check valves 46 and 48 in the first and second pressure passages 45 and 47 from the compression and rebound chambers 24 and 26, respectively. As a result, that greater pressure level appears on both sides of the main poppet 43. The additional force from the first spring 50 biases the main poppet against the valve seat 42 so that fluid does not flow between the compression and rebound chambers 24 and 26 through the valve seat 42.

To provide fail-safe operation of the vibration damper 10 in the event of loss of electrical power for the solenoid 74, a relatively small flow path is provided through the piston 30 between the compression and rebound chambers 24 and 26 in the de-energized state. When the compression chamber 24 has a greater pressure than the rebound chamber 26, that path includes the first pressure passage 45 conveying fluid into the pilot chamber 44 past the first check valve 46. Otherwise when the rebound chamber 26 has a greater pressure, fluid flows through the exterior recess 41 around the piston body 34 and into the apertures 37 that lead though the piston into interior chamber 39. Fluid flows from that interior chamber through the second pressure passage 47 and second check valve 48 into the pilot chamber 44. In either of those pressure conditions, the small vent orifice 57 in the pilot valve body 49 just above the first fluid passage 54 opens continuously into the annular groove 62 around the pilot spool 56 regardless of the position of the pilot spool. From the pilot spool's annular groove 62, the fluid is conveyed through the second fluid passages 58 into the pressure cavity 60. Therefore, even when the first fluid passages 54 are closed by the pilot spool 56, a relatively small first fluid passageway still exists via the vent orifice 57 between the pilot chamber 44 and the pressure cavity 60. The relatively small size of vent orifice 57 restricts pilot fluid flow, thereby limiting the rate at which the valve assembly 40 responds to pressure changes in the rebound and compression chambers, which results in moderately stiff vibration damping. When the rebound chamber 26 has a lower pressure than the compression chamber 24, the fluid flows through the fourth pressure passage 68 and the fourth check valve 70 into the rebound chamber. Otherwise when the compression chamber 24 has the lower pressure fluid from the second fluid passages 58 is communicated via the third pressure passage 64 past the third check valve 66 and into the compression chamber.

When an electric current is applied to the electromagnetic coil 80 within the solenoid 74, a magnetic field is generated that moves the armature 76 downward in the illustrated orientation of the components. The amount of that motion is in direct proportion to the magnitude of the electric current, thereby proportionally controlling the fluid flow through the piston 30. The pilot spool 56 operates as a pilot valve controlling the amount that the poppet 43 moves away from the valve seat 42, and thus the size of the primary passage between the two cylinder chambers 24 and 26. Thus, the fluid flow between the rebound and compression chambers and thus stiffness of the vibration damper vary depending upon the position of the pilot spool 56 attached to the armature 76.

Figure 5:
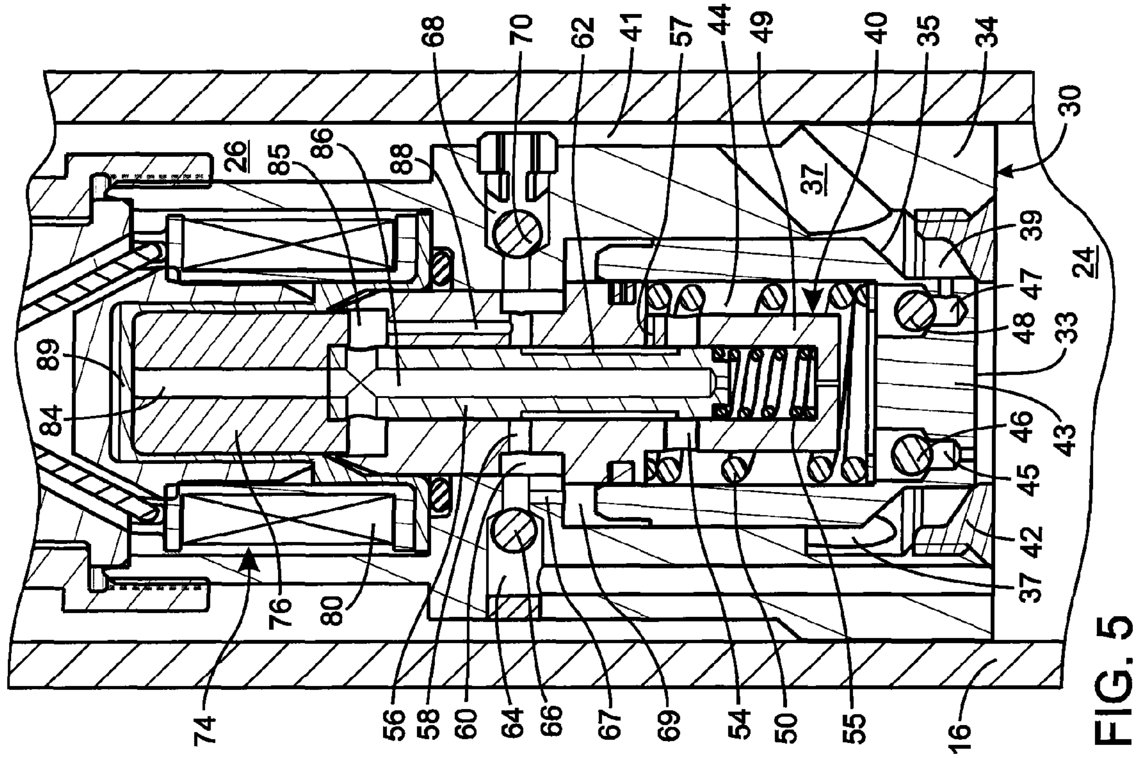
FIG. 5 is a cross sectional view of the piston assembly in a state that provides a soft damping effect.

With reference to FIG. 5, a moderate level of current applied to the electromagnetic coil 80 moves the pilot spool 56 into a second position in which the annular groove 62 around the pilot spool 56 communicates with both the first and second fluid passages 54 and 58. This provides a relatively large path through which pressure within the pilot chamber 44 is relieved via the third or fourth pressure passage 64 or 68 to either the compression or rebound chamber 24 or 26 whichever has the lower pressure. That is this second position of the pilot spool 56 creates a second fluid passageway that is larger than the first fluid passageway provided in the de-energized state. With pressure within the pilot chamber released, the pressure from the compression chamber 24 applied to the first poppet surface 33 or the pressure from the rebound chamber 26 applied to the second poppet surface 35, whichever pressure is greater, exerts a force that pushes the poppet away from the valve seat 42. The poppet 43 moves until the combined forces from the first spring 50 and pressure remaining in the pilot chamber 44 counter balance the pressure force which moved the poppet away from the valve seat 42. This force balance defines the amount that the valve assembly 40 opens and thus the flow rate of fluid through the piston 30. As fluid flows between the compression and rebound chambers 24 and 26, the piston moves within the cylinder 16 until the pressures in those chambers equalize thereby exerting identical force on both sides of the piston. Thus lower magnitudes of electric current applied to the electromagnetic coil 80 produce a relative soft vibration damping effect. Reference to the size of a fluid path relates to the amount of flow that is able to flow through the respective path.

Figure 6:
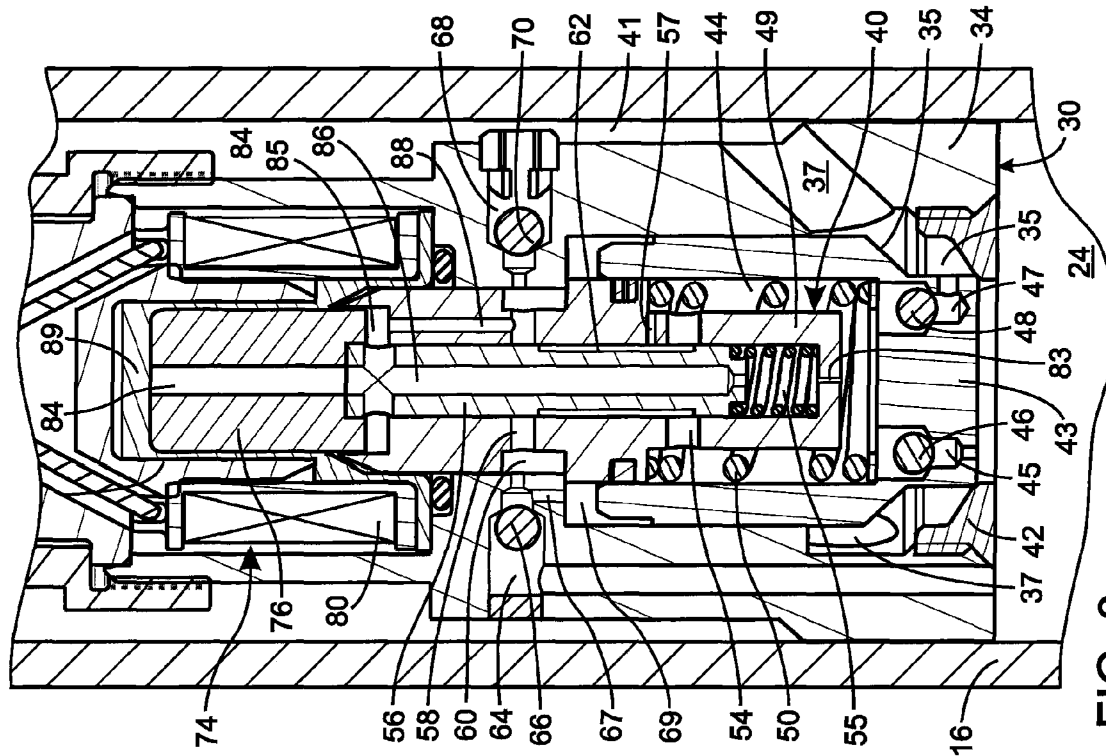
FIG. 6 is a cross sectional view of the piston assembly in a state that provides a hard damping effect.

As shown in FIG. 6, a relatively high level of electric current applied to the electromagnetic coil 80 pushes the armature 76 and the pilot spool 56 farther downward into a third position in which the upper end of the spool's annular groove 62 is below the second fluid passages 58 and no longer opens into those passages. Therefore, in this third position of the pilot spool substantial fluid flow between the pilot chamber 44 and the pressure cavity 60 is blocked. Although the small orifice 83 in the pilot valve body 49 provides an exit path from the pilot chamber 44, the tiny size of that orifice allows only an insubstantial flow that does not enable the valve assembly 40 to respond rapidly to pressure changes in the rebound and compression chambers. As a practical result, the greater pressure from the compression or rebound chamber 24 or 26 is present on both sides of the poppet 43, thereby enabling force from the first spring 50 to hold the poppet 43 firmly against the valve seat 42. In this state, a very large pressure within one of the compression or rebound chambers 24 or 26 is required to unseat the poppet 43 before any flow occurs through the piston 30 between those chambers. This provides very hard vibration damping.

Figure 7:
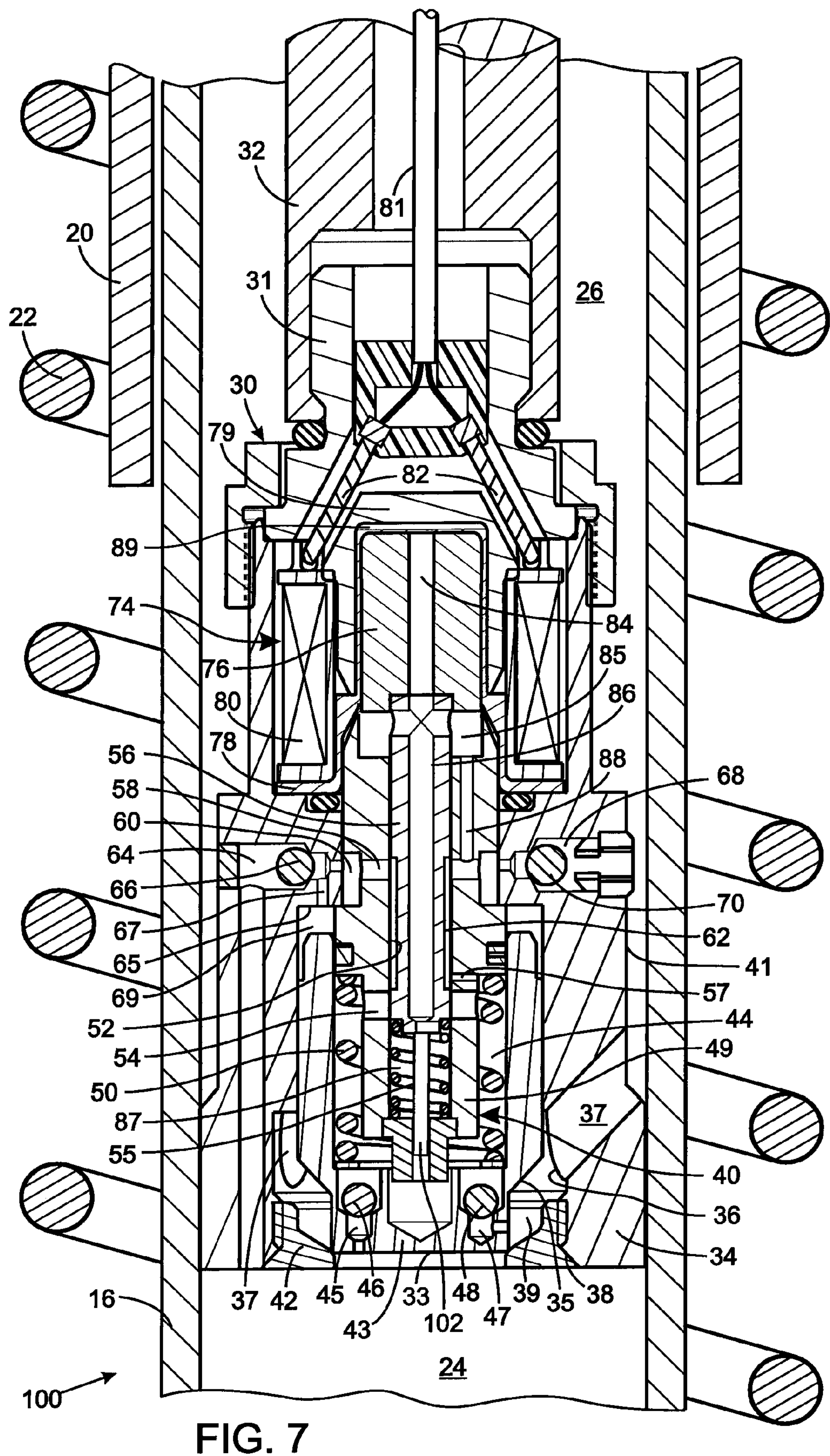
FIG. 7 is a longitudinal cross sectional view of an alternative piston assembly in a de-energized state within the hydraulic vibration damper.

FIG. 7 illustrates an alternative piston assembly 100 that is similar to the assembly 10 in FIG. 2 with identical components being assigned the same reference numerals. The only difference being the use of a pressure sensing pin 102 that has one end exposed to the pressure in the pilot chamber 44 and an opposite end that abuts the pilot spool 56. This pressure sensing pin 102 replaces the application of the pressure in the pilot chamber 44 into the spool cavity 87 where that pressure acted directly on the pilot spool 56. In assembly 100 the pilot chamber pressure acts on the one end of the pressure sensing pin 102 which conveys the resultant force to the pilot spool 56. The relatively small diameter of the pressure sensing pin 102 as compared to the diameter of the lower end of the pilot spool 56 forms a pressure divider, similar to that provides by orifice 83 in the previous assembly 10, so that the pressure within the spool cavity 87 is proportionally related to the pressure within the pilot chamber 44. Otherwise the alternative piston assembly 100 has the same construction and function as described above with respect to piston assembly 10.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A piston for a vibration damper that has a cylinder and a piston assembly with a rod extending out of the cylinder, the piston assembly includes a piston slidably received within the cylinder thereby defining a compression chamber and a rebound chamber each having fluid under pressure therein, the piston comprising:

- a piston body that has a bore with a valve seat therein through which fluid flows between the compression and rebound chambers;
- a poppet engaging and disengaging the valve seat;
- a pilot chamber on a side of the poppet remote from the valve seat;
- a first logic arrangement which applies a greater one of the pressure in the compression and the pressure in the rebound chamber to the pilot chamber;
- a pressure cavity in the piston body;
- a pilot valve member varying an amount of fluid flow between the pilot chamber and the pressure cavity;
- a second logic arrangement which opens the pressure cavity to whichever of the compression and rebound chambers has a lower pressure than pressure in the pressure cavity;
- a first fluid passage opening into the pilot chamber;
- a vent orifice opening into the pilot chamber and providing a smaller flow path than the first fluid passage; and
- a second fluid passage opening into the pressure cavity, wherein the pilot valve member comprises a pilot spool selectively providing fluid communication between the first fluid passage, the vent orifice and the second fluid passage; and
- an electrically operated actuator that moves the pilot valve member.

2. The piston as recited in claim 1 wherein the pilot valve member has a first position which allows fluid to flow between the pilot chamber and the pressure cavity at a first rate, a second position which allows fluid to flow between the pilot chamber and the pressure cavity at a second rate that is greater than the first rate, and a third position which blocks substantial fluid flow between the pilot chamber and the pressure cavity.

3. The piston as recited in claim 2 wherein the first position occurs when the electrically operated actuator is de-energized.

4. The piston as recited in claim 1 wherein the pilot spool has a first position in which the second fluid passage communicates with only the vent orifice, a second position in which the second fluid passage communicates with the first fluid passage, and a third position which blocks fluid flow to and from the second fluid passage.

5. The piston as recited in claim 1 wherein the piston comprises a pilot bore within which the pilot spool slides, wherein the first fluid passage, the vent orifice and the second fluid passage open into the pilot bore; and wherein the pilot spool has an annular groove which provides fluid communication between first fluid passage, the vent orifice and the second fluid passage.

6. The piston as recited in claim 5 wherein in all positions of the pilot spool, the vent orifice continuously provides a fluid path between the pilot chamber and the annular groove of the pilot spool.

7. A piston for a vibration damper that has a cylinder and a piston assembly with a rod extending out of the cylinder, the piston assembly includes a piston slidably received within the cylinder thereby defining a compression chamber and a rebound chamber each having fluid under pressure therein, the piston comprising:

a piston body that has a bore with a valve seat therein through which fluid flows between the compression and rebound chambers;

a poppet en a in and disengaging the valve seat;

a pilot valve body within the bore of the piston body and having a pilot bore;

a pressure cavity in the piston body;

a pilot chamber on a side of the poppet remote from the valve seat, and formed between the pilot valve body and the poppet;

a pilot valve member varying an amount of fluid flow between the pilot chamber and the pressure cavity, wherein the pilot valve member comprises a pilot spool moveably received within the pilot bore;

a first logic arrangement which applies a greater one of the pressure in the compression and the pressure in the rebound chamber to the pilot chamber;

a second logic arrangement which opens the pressure cavity to whichever of the compression and rebound chambers has a lower pressure than pressure in the pressure cavity; and an electrically operated actuator that moves the pilot valve member.

8. The piston as recited in claim 7 further comprising a spring biasing the pilot spool in one direction within the pilot valve body.

9. The piston as recited in claim 7 wherein a spool cavity is formed within the pilot valve body at one end of the pilot spool, and an orifice extends within the pilot valve body between the spool cavity and the pilot chamber.

10. The piston as recited in claim 7 further comprising a pressure sensing pin that has one end exposed to the pressure in the pilot chamber and an opposite end that applied force to the pilot spool.

11. The piston as recited in claim 1 wherein:

the first logic arrangement comprises a first check valve through which fluid flows from the compression chamber to the pilot chamber, and a second check valve through which fluid flows from the rebound chamber to the pilot chamber; and the second logic arrangement comprises a third check valve through which fluid flows from the pressure cavity to the compression chamber, and a fourth check valve through which fluid flows from the pressure cavity to the rebound chamber.

12. The piston as recited in claim 1 further comprising a spring biasing the poppet toward the valve seat.

13. A piston for a vibration damper that has a cylinder and a piston assembly with a rod extending out of the cylinder, the piston assembly includes a piston slidably received within the cylinder thereby defining a compression chamber and a rebound chamber each having fluid under pressure therein, the piston comprising:

a piston body that has a bore with a valve seat therein through which fluid flows between the compression and rebound chambers;

a poppet engaging and disenga in valve seat;

a pilot chamber on a side of the poppet remote from the valve seat;

a first logic arrangement which applies a greater one of the pressure in the compression and the pressure in the rebound chamber to the pilot chamber;

a pressure cavity in the piston body;

a pilot valve member varying an amount of fluid flow between the pilot chamber and the pressure cavity;

a second logic arrangement which opens the pressure cavity to whichever of the compression and rebound chambers has a lower pressure than pressure in the pressure cavity;

a piston cavity between the poppet and the piston body, a bleed orifice providing a fluid path between the piston cavity and the pressure cavity; and an electrically operated actuator that moves the pilot valve member.

14. The piston as recited in claim 1 wherein the electrically operated actuator comprises an armature secured to the pilot valve member and defining armature cavities on opposite side of the armature; and further comprising a passageway connecting the armature cavities to the pressure cavity.

15. A piston for a vibration damper that has a cylinder and a piston assembly with a rod extending out of the cylinder, the piston assembly including a piston slidably received within the cylinder thereby defining a compression chamber and a rebound chamber, the piston comprising:

a piston body having a bore with separate openings in fluid communication with the compression chamber and the rebound chamber and a valve seat within the bore between those openings;

a poppet moveable within the bore to engage and disengage the valve seat and having a pilot chamber on a side of the poppet remote from the valve seat;

a first check valve through which fluid flows from the compression chamber to the pilot chamber;

a second check valve through which fluid flows from the rebound chamber to the pilot chamber;

a pilot bore into which a first fluid passage opens from the pilot chamber and into which a second fluid passage opens;

a third check valve through which fluid flows from the second fluid passage to the compression chamber;

a fourth check valve through which fluid flows from the second fluid passage to the rebound chamber;

a pilot valve element received within the pilot bore and selectively controlling flow of fluid between the first and second fluid passages; and an electrically operated actuator that moves the pilot valve element.

16. The piston as recited in claim 15 wherein the pilot valve element is a pilot spool with an annular groove that provides a path between the first and second fluid passages.

17. The piston as recited in claim 15 further comprising a vent orifice extending between the pilot chamber and the pilot bore; wherein the pilot valve element has a first position in which communication between the first and second fluid passages is blocked and a path exists between the vent orifice and the second fluid passage, a second position in which a path is provided between the first and second fluid passages, and a third position in which fluid blocked from flowing between the second fluid passage and both the vent orifice and the first fluid passage.

18. The piston as recited in claim 17 wherein the first position occurs when the electrically operated actuator is de-energized.

19. The piston as recited in claim 15 wherein the piston further comprises a pilot valve body within the bore of the piston body and extending into the poppet, wherein the pilot chamber is formed therebetween, and the pilot valve body having a pilot bore within which the pilot valve element is received.

20. The piston as recited in claim 19 wherein a cavity is formed within the pilot valve body at one end of the pilot valve element, and an orifice extends within the pilot valve body between the cavity and the pilot chamber.

21. The piston as recited in claim 15 further comprising a piston cavity between the poppet and the piston body, and a bleed orifice providing a fluid path between the piston cavity and the second fluid passage.

22. The piston as recited in claim 15 wherein the electrically operated actuator comprises an armature secured to the pilot valve element and defining armature cavities on opposite side of the armature; and further comprising a passageway connecting the armature cavities to the second fluid passage.

* * * * *

UNITED STATES PATENT AND TRADEMARK OFFICE

CERTIFICATE OF CORRECTION

PATENT NO. : 7,878,311 B2
APPLICATION NO. : 11/779958
DATED : February 1, 2011
INVENTOR(S) : Curtis L. Van Weelden et al.

It is certified that error appears in the above-identified patent and that said Letters Patent is hereby corrected as shown below:

Column 9, line 4, claim 7:
"poppet en a in and" should be
--poppet engaging and--

Column 9, line 59, claim 13:
"and disenga in valve" should be
--and disengaging the valve--

Signed and Sealed this
Fifth Day of April, 2011

David J. Kappos
*Director of the United States Patent and Trademark Office*